(12) United States Patent
Park et al.

(10) Patent No.: US 6,393,024 B1
(45) Date of Patent: May 21, 2002

(54) ASYNCHRONOUS TRANSFER MODE (ATM) SWITCH NETWORK WITH EXPANSIBLE OPTICAL RING

(75) Inventors: Seung Kyun Park; Jun Kyun Choi, both of Daejeon (KR)

(73) Assignees: Electronics and Telecommunications Research Institute, Daejeon; Korea Telecom, Seoul, both of (KR)

( * ) Notice: Subject to any disclaimer, the term of this patent is extended or adjusted under 35 U.S.C. 154(b) by 0 days.

(21) Appl. No.: 09/139,544

(22) Filed: Aug. 25, 1998

(30) Foreign Application Priority Data

Aug. 26, 1997 (KR) .............................................. 97-41042

(51) Int. Cl.7 .............................................. H04L 12/28
(52) U.S. Cl. ........................................ 370/395; 370/535
(58) Field of Search ................................ 370/395, 396, 370/397, 399, 409, 424, 535

(56) References Cited

U.S. PATENT DOCUMENTS

| | | | | |
|---|---|---|---|---|
| 5,742,605 A | * | 4/1998 | Norman, Jr. ................. | 370/405 |
| 5,886,992 A | * | 3/1999 | Raatikainen et al. ....... | 370/410 |
| 6,084,694 A | * | 7/2000 | Milton et al. ............... | 359/124 |
| 6,233,074 B1 | * | 5/2001 | Lahat et al. ................ | 359/118 |

* cited by examiner

Primary Examiner—Wellington Chin
Assistant Examiner—Brenda Pham
(74) Attorney, Agent, or Firm—Cohen, Pontani, Lieberman & Pavane

(57) ABSTRACT

An ATM switch network with an expansible optical ring, in which each switch forms several paths with a vertical ring, a horizontal ring and an expansible ring. The network has a large-capacity and a small switching interval, minimizing cell delay deviation and rendering the network suitable for high-speed multimedia service. A group switch node is formed by grouping the switches forming the vertical and horizontal rings, thereby enhancing reliability within a transmission interval by bisecting the wavelength division multiplexed logical paths and by using two optical lines. The network discriminates between I/O terminals for matching data having a low-speed small capacity and wavelength division I/O terminals for matching data having a high-speed large capacity. By using a node's I/O terminals, the network interconnects nodes via wavelength division multiplexing optical lines, thereby forming an automatic adaptive network. The network increases switching capacity, thereby improving communications in densely built-in areas.

5 Claims, 7 Drawing Sheets

ASYNCHRONOUS TRANSFER MODE (ATM) SWITCH NETWORK WITH EXPANSIBLE OPTICAL RING

BACKGROUND OF THE INVENTION

1. Field of the Invention

The present invention generally relates to an asynchronous transfer mode (hereinafter referred to as ATM) switch network with expansible optical ring. More particularly, it relates to an ATM switch network with expansible optical ring which constructs a switch network and a transmission at the same time, constructs two optical links in consideration of the reliability of the transmission, makes group switch nodes be an expansible ring according to a primary expansion method in order to expand a switching capacity, performs a wavelength division multiplexing about a plurality of ATM switch networks whose group switch nodes are constructed as the expansible ring, connects the ATM switch networks between two optical links bisected, thereby making a large switching capacity.

2. Description of the Conventional Art

Conventionally, since a wavelength division packet switch technique uses a space division switching that is a line switching system of a wavelength unit or a cross-point switching, many switching bands are wasted and a switching channel has a lower efficiency.

Due to a disadvantage of the conventional switching system, a capacity of a processor managing a switching control data should previously have a maximum switching capacity, irrespective of a switching capacity's extensibility. Accordingly, there is a limitation of the extensibility in the conventional switching systems.

In addition, the conventional switching system should have a transmission device apart from a switch node. If traffic is concentrated at a specific switch node, a traffic saturation status occurs in a transmission device, thereby causing a hot spot of the traffic. Under this condition, an entire switch network may be out of control. For an extensibility of the switching capacity, a switching capacity should be expanded by constructing a network using a separate transmission device.

Therefore, although an ATM switch network having a small capacity is constructed as a network through transmission devices, a traffic distributed system of a separate transmission device is needed, and an additional matching circuit is needed because a switch and transmission are dualized.

It is necessary to expand a transmission capacity simultaneously with expanding a switching capacity of the switch network. A switching capacity expansion in view of the entire network should consider not only a step-up of the capacity, and should consider both a switching control processing capacity and a transmission capacity in consideration of the traffic.

SUMMARY OF THE INVENTION

Accordingly, the present invention is directed to an ATM switch network with expansible optical ring that substantially obviates one or more of the problems due to limitations and disadvantages of the conventional art.

It is an object of the present invention to provide an ATM switch network with an expansible optical ring which simultaneously constructs a switch network and a transmission, constructs two optical links in consideration of a reliability of the transmission, makes group switch nodes be an expansible ring according to a primary expansion method in order to expand a switching capacity, performs a wavelength division multiplexing about a plurality of ATM switch networks whose group switch nodes are constructed as the expansible ring, connects the ATM switch networks between by using two optical links bisected, thereby making a large switching capacity.

To achieve the above objective, the present invention constructs a three-dimensional ring with an extensibility by forming a closed loop composed of a vertical ring, a horizontal ring and an expansible ring by using 4×4 ATM unit switch elements. Also, the present invention groups the 4×4 ATM unit switch elements forming the vertical ring and the horizontal ring, thereby making a group switch node. The group switch node receives data having a low-speed small capacity and data having a high-speed large capacity by an Input/Output (I/O) operation of a switch network, and matches the data having low-speed small capacity with the data having high-speed large capacity. The data having a high-speed large capacity is input to each 4×4 ATM unit switch element via two wavelength division demultiplexers of which channels are bisected by two optical lines. The output signal of each ATM unit switch element passes through a wavelength division multiplexer in response to the bisected channel. The group switch node receives data for matching the data having a high-speed large capacity by the I/O operation of the switch network, and matches the data. The data having high-speed large capacity is output to each 4×4 ATM unit switch element through two optical lines and the wavelength division demultiplexer. A plurality of ATM switch networks being composed of group switch nodes having a high-speed large capacity data matching circuit interconnect wavelength division I/O terminals of the switch node by using wavelength division multiplexing optical lines, and thus have an extensibility of a super-large capacity.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The preferred embodiment of the present invention will become apparent from a study of the following detailed description, when viewed in light of the accompanying drawings.

Figure 1:
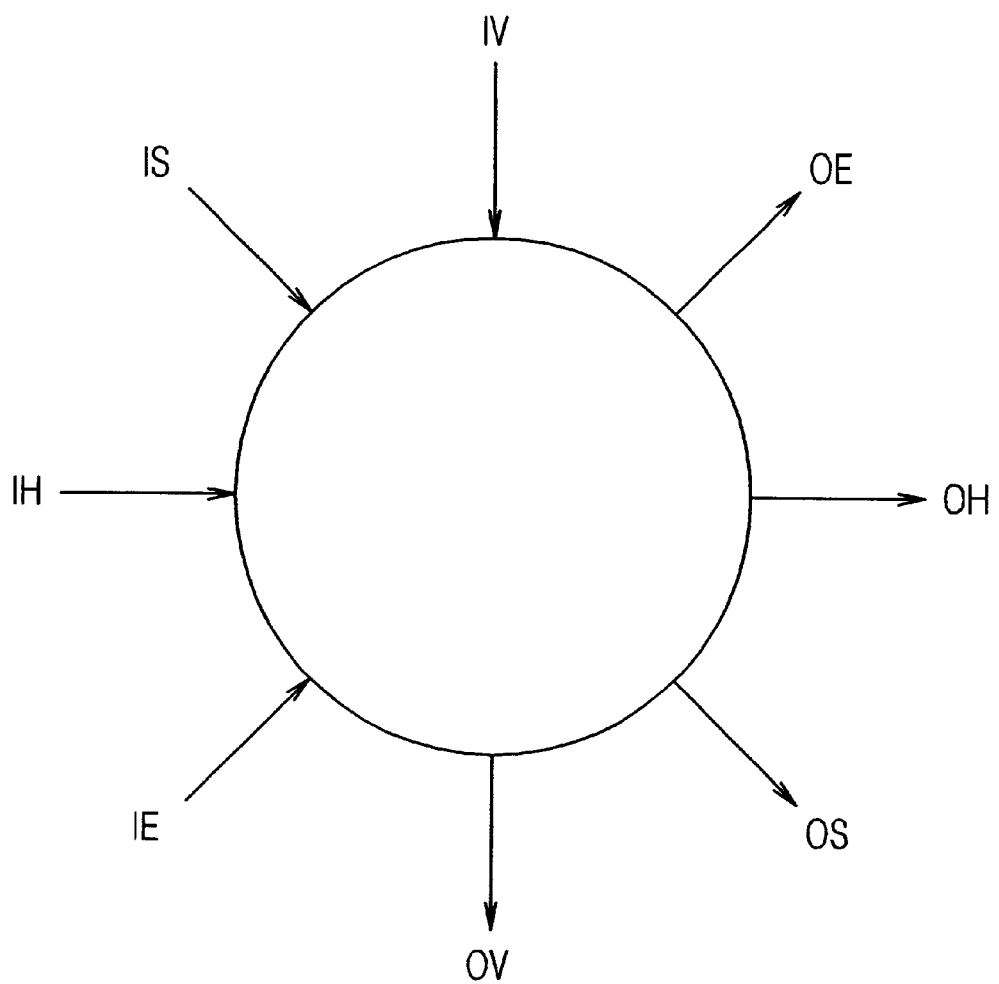
FIG. 1 shows a structure of a 4×4 ATM unit switch element according to the present invention.

FIG. 1 shows a structure of the 4×4 ATM unit switch element according to the present invention. The 4×4 ATM unit switch element includes: four input terminals IE, IH, IS and IV and four output terminals OE, OH, OS and OV.

A switching action of the ATM cell unit occurs in the ATM unit of FIG. 1, and may be output to the four output terminals OE, OH, OS and OV.

Figure 2:
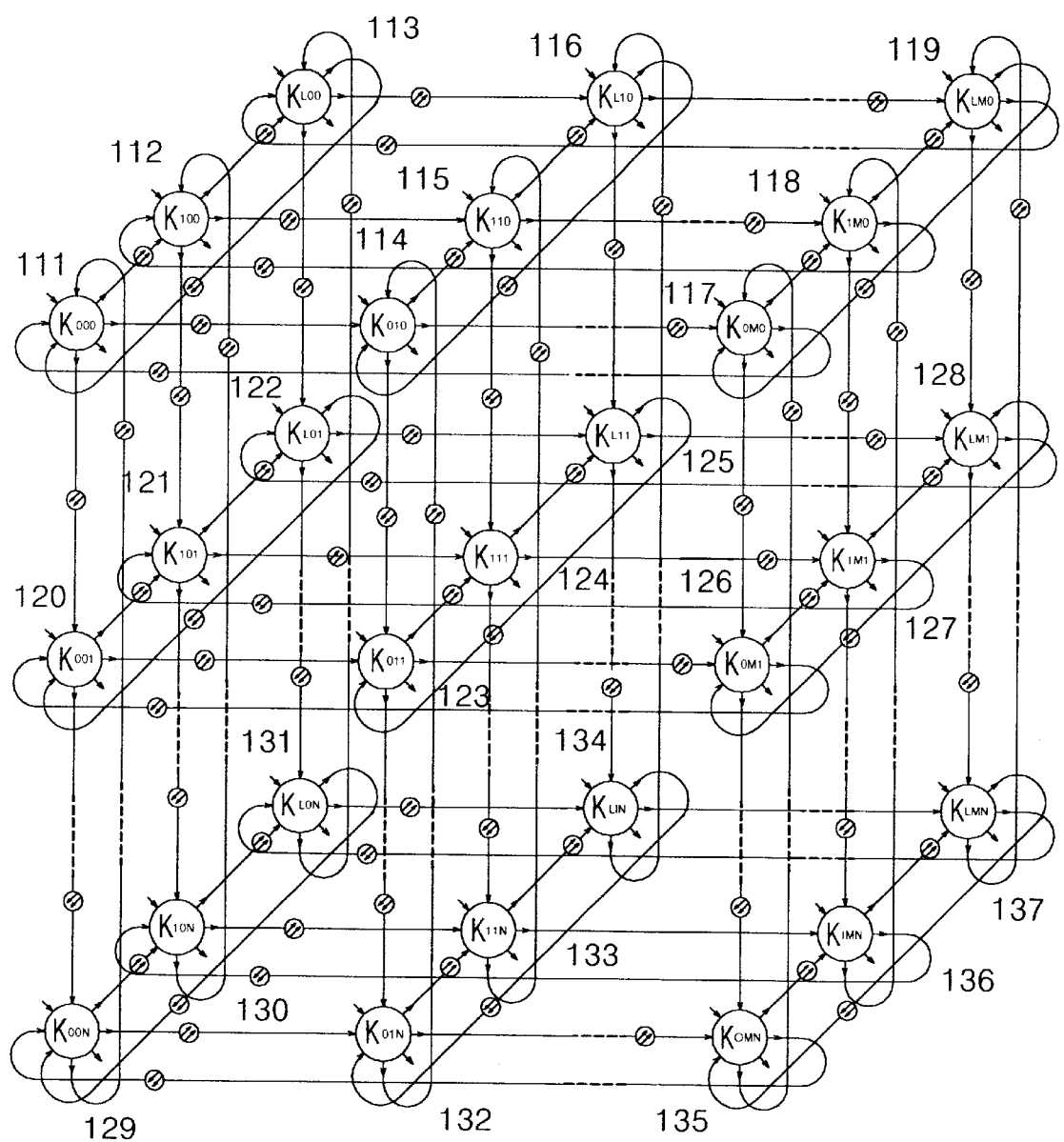
FIG. 2 shows a structure of an ATM switch network forming a three-dimensional ring network comprised of 4×4 ATM unit switch elements according to the present invention.

FIG. 2 shows a structure of an ATM switch network forming a three-dimensional ring network comprised of 4×4 ATM unit switch elements according to the present invention. The 4×4 ATM unit switch network includes: a plurality of 4×4 ATM unit switch elements; four input terminals of ATM cell unit; and four output terminals at which signals are generated after performing an internal switching action.

As shown in FIG. 2, numerals 111, 112, 113, 114, 115, 156 116, 117, 118, 119, 120, 121, 122, 123, 124, 125, 126, 127, 128, 129, 130, 131, 132, 133, 134, 135, 136, and 137 indicate 4×4 ATM unit switch elements. Here, a signal of an ATM cell unit is input to each of four input terminals IE, IH, IS and IV, and a switching action of the ATM cell unit is then performed, therefore the signal is output to each of four output terminals OE, OH, OS and OV.

Accordingly, the number of 4×4 ATM unit switch elements used is (L+1)×(M+1)×(N+1), and therefore, an entire switching capacity is {(L+1)×(M+1)×(N+1)}INPUT×{(L+1)×(M+1)×(N+1)}OUTPUT.

Among characters (K, L, M and N) representing logical addresses, the character "K" is an address for identifying an ATM switch network, the character "L" is an address for identifying an 4×4 ATM switch element positioned at the expansible ring, the character "M" is an address for identifying 4×4 ATM switch element positioned at a horizontal ring, and the character "N" is an address for identifying 4×4 ATM switch element positioned at a vertical ring.

As shown in FIG. 2, an output terminal OV of a switch element 111 is connected to an input terminal IV of a switch element 120 via an optical signal. An output terminal OV of the switch element 120 is connected to an input terminal IV of a switch element 129 via an optical signal. An output terminal OV of the switch element 129 is connected to an input terminal IV of a switch element 111 via an optical signal. As a result, a closed loop of a vertical ring is formed.

An output terminal OV of a switch element 114 is connected to an input terminal IV of a switch element 123 via an optical signal. An output terminal OV of the switch element 123 is connected to an input terminal IV of a switch element 132 via an optical signal. An output terminal OV of the switch element 132 is connected to an input terminal IV of a switch element 114 via an optical signal. As a result, a closed loop of a vertical ring is formed.

An output terminal OV of a switch element 117 is connected to an input terminal IV of a switch element 126 via an optical signal. An output terminal OV of the switch element 126 is connected to an input terminal IV of a switch element 135 via an optical signal. An output terminal OV of the switch element 135 is connected to an input terminal IV of a switch element 117 via an optical signal. As a result, a closed loop of a vertical ring is formed.

In addition, an output terminal OH of a switch element 111 is connected to an input terminal IH of a switch element 114 via an optical signal. An output terminal OH of the switch element 114 is connected to an input terminal IH of a switch element 117 via an optical signal. An output terminal OH of the switch element 117 is connected to an input terminal IH of a switch element 111 via an optical signal. As a result, a closed loop of a horizontal ring is formed.

An output terminal OH of a switch element 129 is connected to an input terminal IH of a switch element 132 via an optical signal. An output terminal OH of the switch element 132 is connected to an input terminal IH of a switch element 135 via an optical signal. An output terminal OH of the switch element 135 is connected to an input terminal IH of a switch element 129 via an optical signal. As a result, a closed loop of a horizontal ring is formed.

Herein, the aforementioned 4×4 ATM unit switch elements (111, 114, 117, 120, 123, 126, 129, 132, and 135) respectively have logical addresses "K000", "K010", "K0M0", "K001", "K011", "K0M1", "K00N", "K01N" and "K0MN", and make a group "K0" switch node comprised of a horizontal ring.

Also, an output terminal OV of a switch element 112 is connected to an input terminal IV of a switch element 121 via an optical signal. An output terminal OV of the switch element 121 is connected to an input terminal IV of a switch element 130 via an optical signal. An output terminal OV of the switch element 130 is connected to an input terminal IV of a switch element 112 via an optical signal. As a result, a closed loop of a vertical ring is formed.

An output terminal OV of a switch element 115 is connected to an input terminal IV of a switch element 124 via an optical signal. An output terminal OV of the switch element 124 is connected to an input terminal IV of a switch element 133 via an optical signal. An output terminal OV of the switch element 133 is connected to an input terminal IV of a switch element 115 via an optical signal. As a result, a closed loop of a vertical ring is formed.

An output terminal OV of a switch element 118 is connected to an input terminal IV of a switch element 127 via an optical signal. An output terminal OV of the switch element 127 is connected to an input terminal IV of a switch element 136 via an optical signal. An output terminal OV of the switch element 136 is connected to an input terminal IV of a switch element 118 via an optical signal. As a result, a closed loop of a vertical ring is formed.

In addition, an output terminal OH of a switch element 112 is connected to an input terminal IH of a switch element 115 via an optical signal. An output terminal OH of the switch element 115 is connected to an input terminal IH of a switch element 118 via an optical signal. An output terminal OH of the switch element 118 is connected to an input terminal IR of a switch element 112 via an optical signal. As a result, a closed loop of a horizontal ring is formed.

An output terminal OH of a switch element 121 is connected to an input terminal IH of a switch element 124 via an optical signal. An output terminal OH of the switch element 124 is connected to an input terminal IH of a switch element 127 via an optical signal. An output terminal OH of the switch element 127 is connected to an input terminal IH of a switch element 121 via an optical signal. As a result, a closed loop of a horizontal ring is formed.

An output terminal OH of a switch element 130 is connected to an input terminal IH of a switch element 133 via an optical signal. An output terminal OH of the switch element 133 is connected to an input terminal IH of a switch element 136 via an optical signal. An output terminal OH of the switch element 136 is connected to an input terminal IH of a switch element 130 via an optical signal. As a result, a closed loop of a horizontal ring is formed.

Herein, the aforementioned 4×4 ATM unit switch elements (112, 115, 118, 121, 124, 127, 130, 133, and 136) respectively have logical addresses "K100", "K110", "K101", "K111", "K1M1", "K10N" and "K11N", and make a group "K1" switch node comprised of a horizontal ring and a vertical ring.

In addition, an output terminal OV of a switch element 113 is connected to an input terminal IV of a switch element 122 via an optical signal. An output terminal OV of the switch element 122 is connected to an input terminal IV of a switch element 131 via an optical signal. An output terminal OV of the switch element 131 is connected to an input terminal IV of a switch element 113 via an optical signal. As a result, a closed loop of a vertical ring is formed.

An output terminal OV of a switch element 116 is connected to an input terminal IV of a switch element 125 via an optical signal. An output terminal OV of the switch element 125 is connected to an input terminal IV of a switch element 134 via an optical signal. An output terminal OV of the switch element 134 is connected to an input terminal IV of a switch element 116 via an optical signal. As a result, a closed loop of a vertical ring is formed.

An output terminal OV of a switch element 119 is connected to an input terminal IV of a switch element 128 via an optical signal. An output terminal OV of the switch element 128 is connected to an input terminal IV of a switch element 137 via an optical signal. An output terminal OV of the switch element 137 is connected to an input terminal IV of a switch element 119 via an optical signal. As a result, a closed loop of a vertical ring is formed.

An output terminal OH of a switch element 113 is connected to an input terminal IH of a switch element 116 via an optical signal. An output terminal OH of the switch element 116 is connected to an input terminal IH of a switch element 119 via an optical signal. An output terminal OH of the switch element 119 is connected to an input terminal IH of a switch element 113 via an optical signal. As a result, a closed loop of a horizontal ring is formed.

An output terminal OH of a switch element 122 is connected to an input terminal IH of a switch element 125 via an optical signal. An output terminal OH of the switch element 125 is connected to an input terminal IH of a switch element 128 via an optical signal. An output terminal OH of the switch element 128 is connected to an input terminal IH of a switch element 122 via an optical signal. As a result, a closed loop of a horizontal ring is formed.

An output terminal OH of a switch element 131 is connected to an input terminal IH of a switch element 134 via an optical signal. An output terminal OH of the switch element 134 is connected to an input terminal IH of a switch element 137 via an optical signal. An output terminal OH of the switch element 137 is connected to an input terminal IH of a switch element 131 via an optical signal. As a result, a closed loop of a horizontal ring is formed.

Herein, the aforementioned 4×4 ATM unit switch elements (113, 116, 119, 122, 125, 128, 131, 134, and 137) respectively have logical addresses "KL00", "KL10", "KLM0", "KL01", "KL01", "KL11", "KLM1", "KL0N", "KL1N" and "KLMN", and make a group "KL" switch node comprised of a horizontal ring and a vertical ring.

Figure 3:
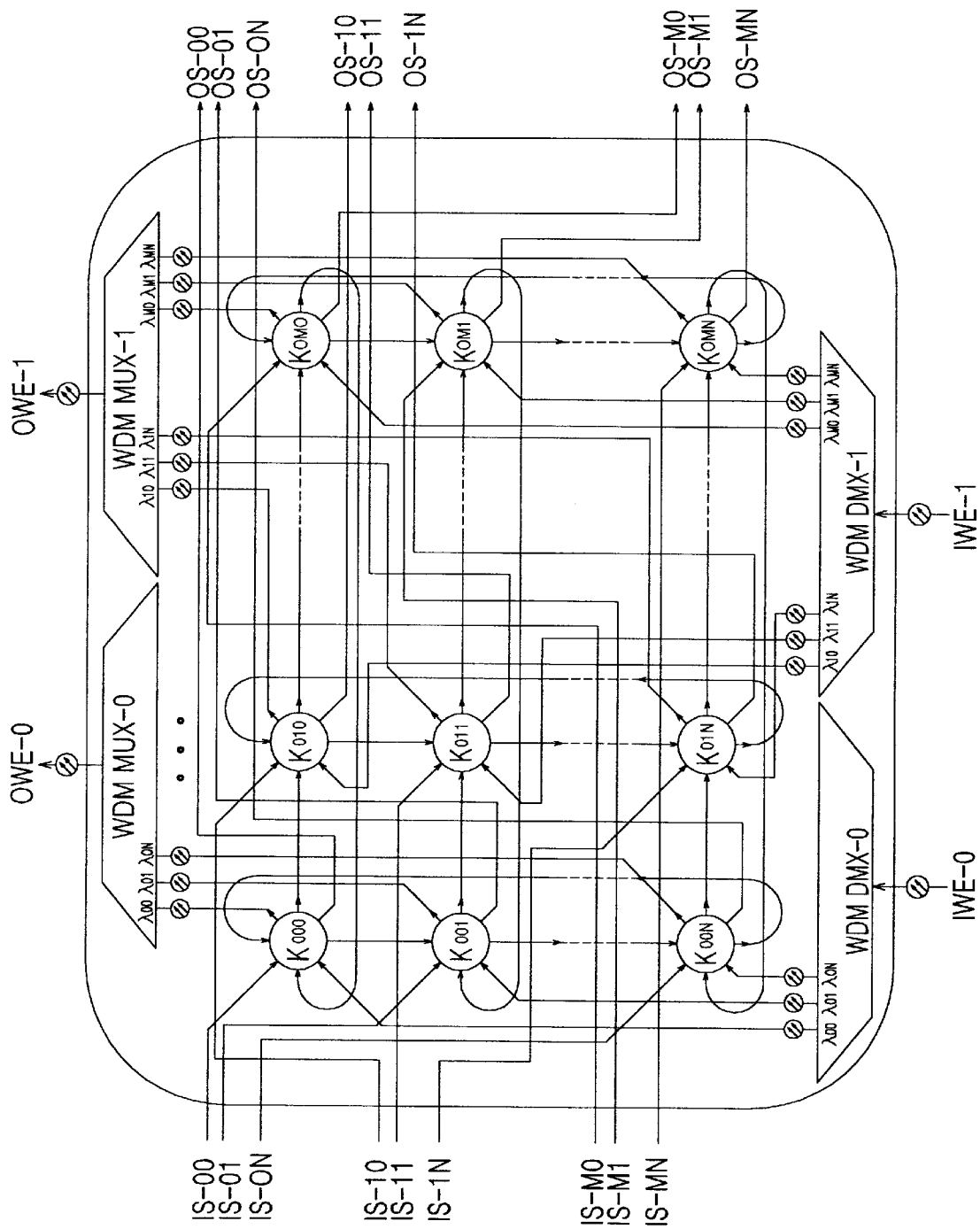
FIG. 3 shows a structure of a group "0" switch node which constructs 4×4 ATM unit switch elements by using a closed loop formed as a vertical ring and a horizontal ring according to the present invention.

FIG. 3 shows a structure of a group "0" switch node which constructs 4×4 ATM unit switch elements by using a closed loop formed as a vertical ring and a horizontal ring according to the present invention.

A wavelength $\lambda_{00}$ outputted from an output terminal OE of an expansible ring of 4×4 ATM unit switch element of the logical address "K000", a wavelength $\lambda_{01}$ outputted from an output terminal OE of an expansible ring of 4×4 ATM unit switch element of the logical address "K001", and a wavelength $\lambda_{0N}$ outputted from an output terminal OE of an expansible ring of 4×4 ATM unit switch element of the logical address "K00N" are input to a wavelength division multiplexer 0(WDM MUX-0), and then are multiplexed. A wavelength division multiplexing output is to be a wavelength division output terminal 0(0WE-0) of the expansible ring.

A wavelength $\lambda_{10}$ outputted from an output terminal OE of an expansible ring of 4×4 ATM unit switch element of the logical address "K010", a wavelength $\lambda_{11}$ outputted from an output terminal OE of an expansible ring of 4×4 ATM unit switch element of the logical address "K011", a wavelength $\lambda_{1N}$ outputted from an output terminal OE of an expansible ring of 4×4 ATM unit switch element of the logical address "K01N", a wavelength $\lambda M0$ outputted from an output terminal OE of an expansible ring of 4×4 ATM unit switch element of the logical address "K0M0", a wavelength $\lambda_{M1}$ outputted from an output terminal OE of an expansible ring of 4×4 ATM unit switch element of the logical address "K0M1", and a wavelength $\lambda_{MN}$ outputted from an output terminal OE of an expansible ring of 4×4 ATM unit switch element of the logical address "K0MN" are input to a wavelength division multiplexer 1(WDM MUX-1), and then are multiplexed. A wavelength division multiplexing output is to be a wavelength division output terminal 1(0WE-1) of the expansible ring.

The wavelength $\lambda_{00}$ which is input to an input terminal IE of the expansible ring of 4×4 ATM unit switch element of the logical address "K000", the wavelength $\lambda_{01}$ which is input to an input terminal IE of the expansible ring of 4×4 ATM unit switch element of the logical address "K001", and the wavelength $\lambda_{0N}$ which is input to an input terminal IE of the expansible ring of 4×4 ATM unit switch element of the logical address "K00N" are that wavelength division multiplexing optical signals input to a wavelength division input terminal 0(IWE-0) are demultiplexed in a wavelength division demultiplexer 0(WDM DMX-0).

The wavelength $\lambda_{10}$ which is input to an input terminal IE of the expansible ring of 4×4 ATM unit switch element of the logical address "K010", the wavelength $\lambda_{11}$ which is input to an input terminal IE of the expansible ring of 4×4 ATM unit switch element of the logical address "K011", the wavelength $\lambda_{1N}$ which is input to an input terminal IE of the expansible ring of 4×4 ATM unit switch element of the logical address "K01N", the wavelength $\lambda_{M0}$ which is input to an input terminal IE of the expansible ring of 4×4 ATM unit switch element of the logical address "K0M0", the wavelength $\lambda_{M1}$ which is input to an input terminal IE of the expansible ring of 4×4 ATM unit switch element of the logical address "K0M1", the wavelength $\lambda_{MN}$ which is input to an input terminal IE of the expansible ring of 4×4 ATM unit switch element of the logical address "K0MN" are the wavelength division multiplexing optical signals input to a wavelength division input terminal 1(IWE-1) that are demultiplexed in a wavelength division demultiplexer 1(WDM DMX-1).

An input terminal 00(IS-00) of a switch element in the logical address "K000", an input terminal 01(IS-01) of a switch element in the logical address "K001", an input terminal 0N(IS-0N) of a switch element in the logical address "K00N", an input terminal 10(IS-10) of a switch element in the logical address "K010", an input terminal 11(IS-11) of a switch element in the logical address "K011", an input terminal 1N(IS-1N) of a switch element in the logical address "K01N", an input terminal M0(IS-M0) of a switch element in the logical address "K0M0", an input terminal M1(IS-M1) of a switch element in the logical address "K0M1", and an input terminal MN(IS-MN) of a switch element in the logical address "K0MN" are the input terminals for matching data having a low-speed small capacity, and become input terminals of a group "K0" switch node.

Also, an output terminal 00(OS-00) of a switch element in the logical address "K000", an output terminal 01(OS-01) of a switch element in the logical address "K001", an output terminal 0N(OS-0N) of a switch element in the logical address "K00N", an output terminal 10(OS-10) of a switch element in the logical address "K010", an output terminal 11(OS-11) of a switch element in the logical address "K011", an output terminal 1N(OS-1N) of a switch element in the logical address "K01N", an output terminal M0(OS-M1) of a switch element in the logical address "K0M0", an output terminal M1(OS-M1) of a switch element in the logical address "K0M1", and an output terminal MN(OS-MN) of a switch element in the logical address "K0MN" are the input terminals for matching data having a low-speed small capacity, and becomes output terminals of the group "K0" switch node.

Herein, 4×4 ATM unit switch elements having the logical addresses ("K000", "K001", "K00N", "K010", "K011", "K01N", "K0M0", "K0M1" and "K0MN") make a closed loop formed as a horizontal ring and a vertical ring, thereby forming a group "K0" switch node as a single ATM switch having a switching capacity being expressed as [{(M+1)×(N+1)}INPUT×{(M+1)×(N+1)}OUTPUT].

Figure 4:
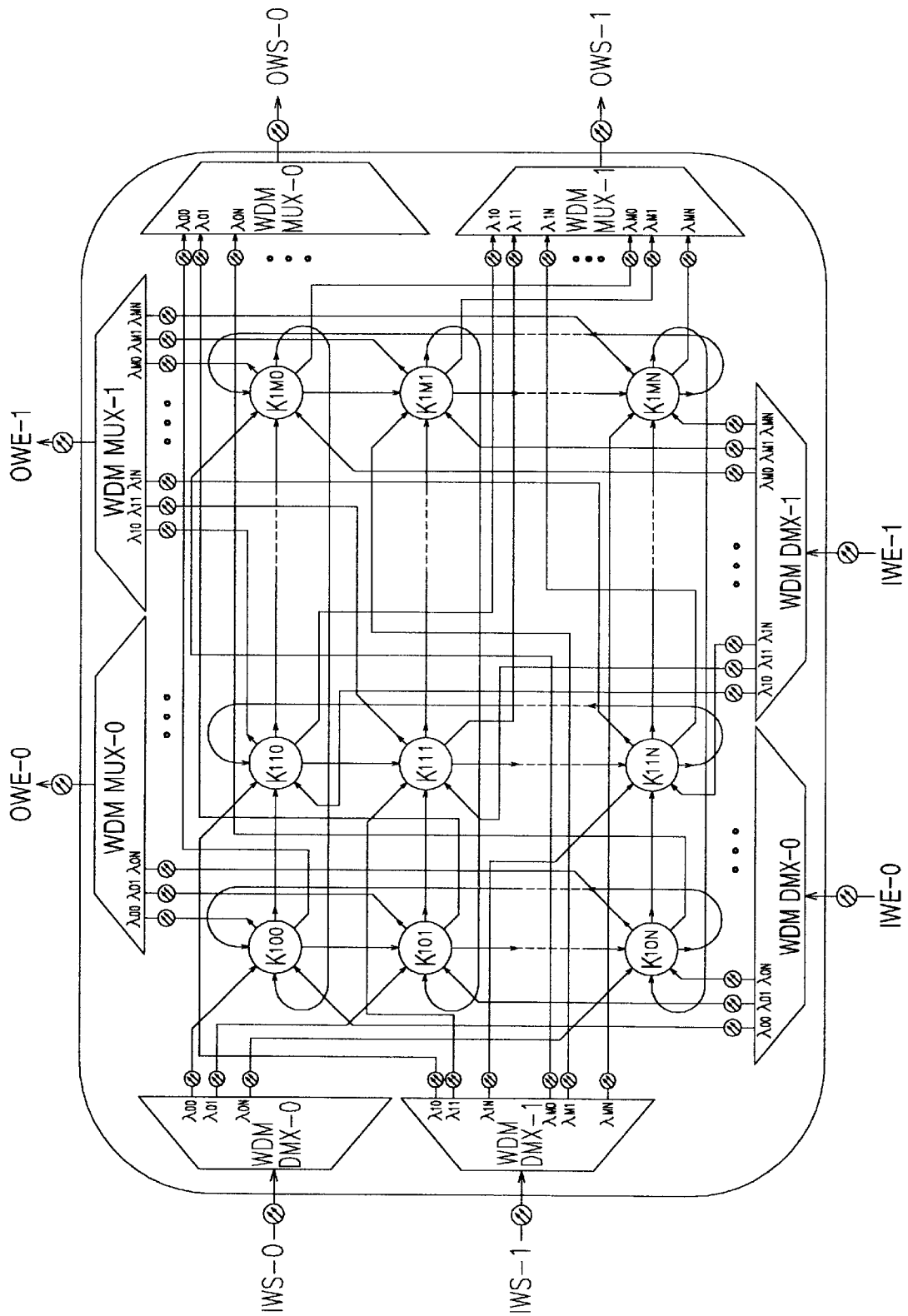
FIG. 4 shows a structure of a group "1" switch node which constructs 4×4 ATM unit switch elements by using a closed loop formed as a vertical ring and a horizontal ring according to the present invention.

FIG. 4 shows a structure of a group "1" switch node which constructs 4×4 ATM unit switch elements by using a closed loop formed as a vertical ring and a horizontal ring according to the present invention.

A wavelength $\lambda_{00}$ outputted from an output terminal OE of an expansible ring of the 4×4 ATM unit switch element of the logical address "K100", a wavelength $\lambda_{01}$ outputted from an output terminal OE of an expansible ring of 4×4 ATM unit switch element of the logical address "K101", and a wavelength $\lambda_{0N}$ outputted from an output terminal OE of an expansible ring of the 4×4 ATM unit switch element of the logical address "K10N" are input to a wavelength division multiplexer 0(WDM MUX-0), and then are multiplexed. A wavelength division multiplexing output is to be a wavelength division output terminal 0(0WE-0) of the expansible ring.

A wavelength $\lambda_{10}$ outputted from an output terminal OE of an expansible ring of the 4×4 ATM unit switch element of the logical address "K110", a wavelength $\lambda_{11}$ outputted from an output terminal OE of an expansible ring of the 4×4 ATM unit switch element of the logical address "K111", a wavelength $\lambda_{1N}$ outputted from an output terminal OE of an expansible ring of the 4×4 ATM unit switch element of the logical address "K11N", a wavelength $\lambda_{M0}$ outputted from an output terminal OE of an expansible ring of the 4×4 ATM unit switch element of the logical address "K1M0", a wavelength $\lambda_{M1}$ outputted from an output terminal OE of an expansible ring of the 4×4 ATM unit switch element of the logical address "K1M1", and a wavelength $\lambda_{MN}$ outputted from an output terminal OE of an expansible ring of the 4×4 ATM unit switch element of the logical address "K1MN" are input to a wavelength division multiplexer 1(WDM MUX-1), and then are multiplexed. A wavelength division multiplexing output is to be a wavelength division output terminal 1(0WE-1) of the expansible ring.

The wavelength $\lambda_{00}$ which is input to an input terminal IE of the expansible ring of the 4×4 ATM unit switch element of the logical address "K100", the wavelength $\lambda_{01}$ which is input to an input terminal IE of the expansible ring of the 4×4 ATM unit switch element of the logical address "K101", and the wavelength $\lambda_{0N}$ which is input to an input terminal IE of the expansible ring of the 4×4 ATM unit switch element of the logical address "K10N" are that wavelength division multiplexing optical signals input to a wavelength division input terminal 0(IWS-0) are demultiplexed in a wavelength division demultiplexer 0(WDM DMX-0).

The wavelength $\lambda_{10}$ which is input to an input terminal IE of the expansible ring of the 4×4 ATM unit switch element of the logical address "K110", the wavelength, $\lambda_{11}$ which is input to an input terminal IE of the expansible ring of the 4×4 ATM unit switch element of the logical address "K111", the wavelength $\lambda_{1N}$ which is input to an input terminal IE of the expansible ring of the 4×4 ATM unit switch element of the logical address "K11N", the wavelength $\lambda_{M0}$ which is input to an input terminal IE of the expansible ring of the 4×4 ATM unit switch element of the logical address "K1M0", the wavelength $\lambda_{M1}$ which is input to an input terminal IE of the expansible ring of the 4×4 ATM unit switch element of the logical address "K1M1", and the wavelength $\lambda_{MN}$ which is input to an input terminal IE of the expansible ring of the 4×4 ATM unit switch element of the logical address "K1MN" are that wavelength division multiplexing optical signals input to a wavelength division input terminal 1(IWE-1) are demultiplexed in a wavelength division demultiplexer 1(WDM DMX-1).

The wavelength $\lambda_{00}$ which is input to an input terminal IS of the expansible ring of the 4×4 ATM unit switch element of the logical address "K100", the wavelength $\lambda_{01}$ which is input to an input terminal IS of the expansible ring of the 4×4 ATM unit switch element of the logical address "K101", and the wavelength $\lambda_{0N}$ which is input to an input terminal IS of the expansible ring of the 4×4 ATM unit switch element of the logical address "K10N" are wavelength division multiplexing optical signals input to a wavelength division input terminal 0(IWS-0), are used to match data having a high-speed large capacity, and are demultiplexed in a wavelength division demultiplexer 0(WDM DMX-0).

The wavelength $\lambda_{10}$ which is input to an input terminal IS of the expansible ring of the 4×4 ATM unit switch element of the logical address "K110", the wavelength $\lambda_{11}$ which is input to an input terminal IS of the expansible ring of the 4×4 ATM unit switch element of the logical address "K111", and the wavelength $\lambda_{1N}$ which is input to an input terminal IS of the expansible ring of the 4×4 ATM unit switch element of the logical address "K11N", the wavelength $\lambda_{M0}$ which is input to an input terminal IS of the expansible ring of the 4×4 ATM unit switch element of the logical address "K1M0", the wavelength $\lambda_{M1}$ which is input to an input terminal IS of the expansible ring of the 4×4 ATM unit switch element of the logical address "K1M1", and the wavelength $\lambda_{MN}$ which is input to an input terminal IS of the expansible ring of the 4×4 ATM unit switch element of the logical address "K1MN" are that wavelength division multiplexing optical signals input to a wavelength division input terminal 1(IWS-1), are used to match data having a high-speed large capacity, and are demultiplexed in a wavelength division demultiplexer 1(WDM DMX-1).

The wavelength $\lambda_{00}$ which is generated from an output terminal OS of the expansible ring of the 4×4 ATM unit switch element of the logical address "K100", the wavelength $\lambda_{01}$ which is generated from an output terminal OS of the expansible ring of the 4×4 ATM unit switch element of the logical address "K101", and the wavelength $\lambda_{0N}$ wich is generated from an output terminal OS of the expansible ring of the 4×4 ATM unit switch element of the logical address "K10N" are input to a wavelength division multiplexer 0(WDM MUX-0) and then multiplexed. The wavelength division multiplexing output signals are used to match data having a high-speed large capacity, and are output to a wavelength division output terminal 0(0WS-0) of a switch node.

The wavelength $\lambda_{10}$ wich is generated from an output terminal OS of the expansible ring of the 4×4 ATM unit switch element of the logical address "K110", the wavelength $\lambda_{11}$ which is generated from an output terminal OS of the expansible ring of the 4×4 ATM unit switch element of the logical address "K111", and the wavelength $\lambda_{1N}$ which is generated from an output terminal OS of the expansible ring of the 4×4 ATM unit switch element of the logical address "K11N", the wavelength $\lambda_{M0}$ which is generated from an output terminal OS of the expansible ring of the 4×4 ATM unit switch element of the logical address "K1M0", the wavelength $\lambda_{M1}$ which is generated from an output terminal OS of the expansible ring of the 4×4 ATM unit switch element of the logical address "K1M1", and the wavelength $\lambda_{MN}$ which is generated from an output terminal OS of the expansible ring of the 4×4 ATM unit switch element of the logical address "K1MN" are input to a wavelength division multiplexer 1(WDM MUX-1) and then multiplexed. The wavelength division multiplexing output signals are used to match data having a high-speed large capacity, and are output to a wavelength division output terminal 1(0WS-1) of a switch node.

Herein, 4×4 ATM unit switch elements having the logical addresses ("K100", "K101", "K10N", "K110", "K111", "K11N", "K1M0", "K1M1" and "K1MN") make a closed loop formed as a horizontal ring and a vertical ring, thereby form a group "K1" switch node as a single ATM switch having a switching capacity being expressed as [{(M+1)×(N+1)}INPUT×{(M+1)×(N+1)}OUTPUT].

Figure 5:
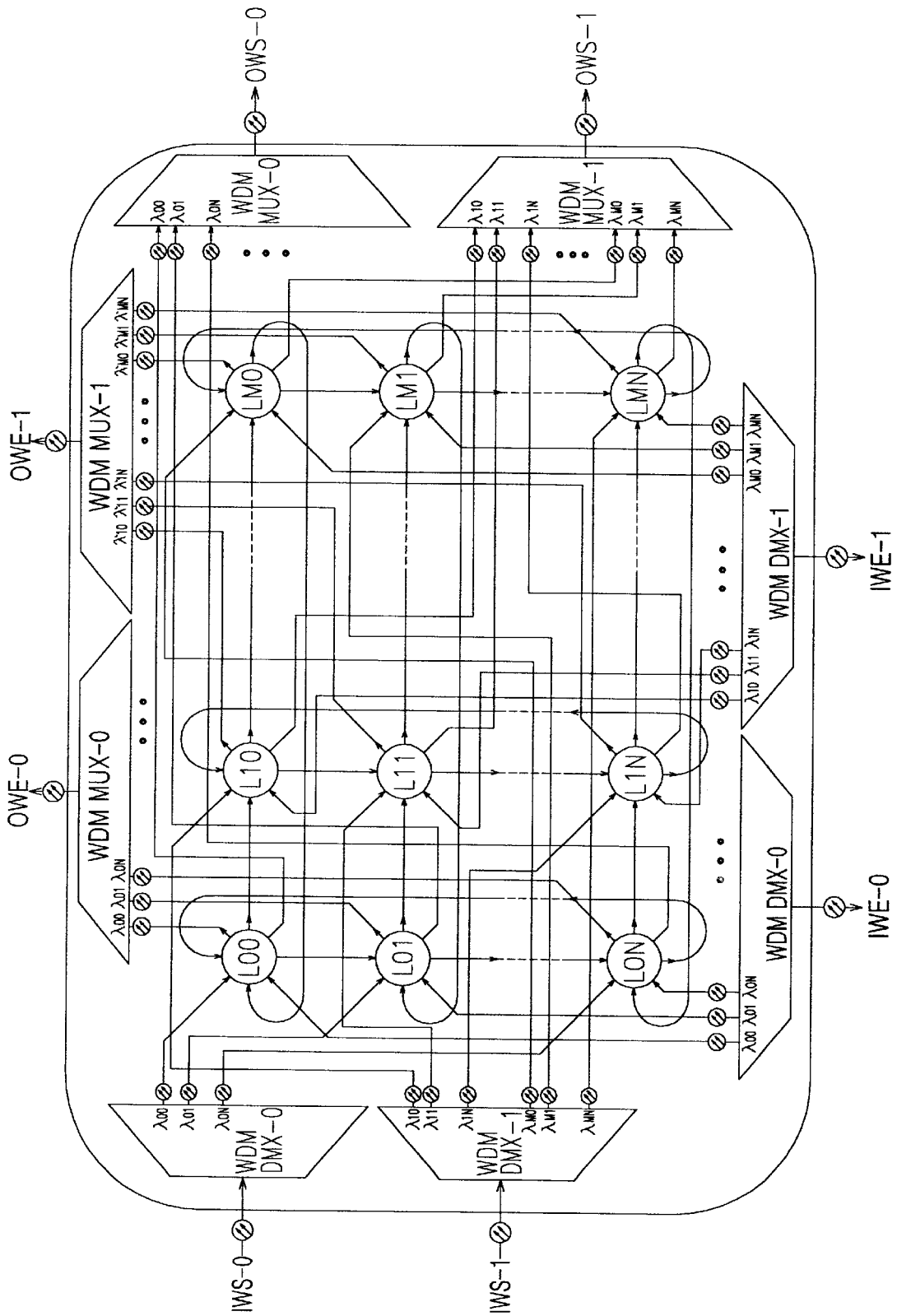
FIG. 5 shows a structure of a group "L" switch node which constructs 4×4 ATM unit switch elements by using a closed loop formed as a vertical ring and a horizontal ring according to the present invention.

FIG. 5 shows a structure of a group "L" switch node which constructs 4×4 ATM unit switch elements by using a closed loop formed as a vertical ring and a horizontal ring according to the present invention.

A wavelength $\lambda_{00}$ outputted from an output terminal OE of an expansible ring of the 4×4 ATM unit switch element of the logical address "KL00", a wavelength $\lambda_{01}$ outputted from an output terminal OE of an expansible ring of the 4×4 ATM unit switch element of the logical address "KL01", and a wavelength $\lambda_{0N}$ outputted from an output terminal OE of an expansible ring of the 4×4 ATM unit switch element of the logical address "KL0N" are input to a wavelength division multiplexer 0(WDM MUX-0), and then are multiplexed. A wavelength division multiplexing output is to be a wavelength division output terminal 0(0WS-0) of the expansible ring.

A wavelength $\lambda_{10}$ outputted from an output terminal OE of an expansible ring of the 4×4 ATM unit switch element of the logical address "KL10", a wavelength $\lambda_{11}$ outputted from an output terminal OE of an expansible ring of the 4×4 ATM unit switch element of the logical address "KL11", a wavelength $\lambda_{1N}$ outputted from an output terminal OE of an expansible ring of the 4×4 ATM unit switch element of the logical address "KL1N", a wavelength $\lambda_{M0}$ outputted from an output terminal OE of an expansible ring of the 4×4 ATM unit switch element of the logical address "KLM0", a wavelength $\lambda_{M1}$ outputted from an output terminal OE of an expansible ring of the 4×4 ATM unit switch element of the logical address "KLM1", and a wavelength $\lambda_{MN}$ outputted from an output terminal OE of an expansible ring of the 4×4 ATM unit switch element of the logical address "KLMN" are input to a wavelength division multiplexer 1(WDM MUX-1), and then are multiplexed.

As shown in FIG. 5, the wavelength $\lambda_{00}$ which is input to an input terminal IE of the expansible ring of the 4×4 ATM unit switch element of the logical address "KL00", the wavelength $\lambda_{01}$ which is input to an input terminal IE of the expansible ring of the 4×4 ATM unit switch element of the logical address "KL01", and the wavelength $\lambda_{0N}$ wich is input to an input terminal IE of the expansible ring of the 4×4 ATM unit switch element of the logical address "KL0N" are the wavelength division multiplexing optical signals input to a wavelength division input terminal 0(IWS-0) and are demultiplexed in a wavelength division demultiplexer 0(WDM DMX-0).

The wavelength $\lambda_{10}$ which is input to an input terminal IE of the expansible ring of the 4×4 ATM unit switch element of the logical address "KL10", the wavelength $\lambda_{11}$ which is input to an input terminal IE of the expansible ring of the 4×4 ATM unit switch element of the logical address "KL11", the wavelength $\lambda_{1N}$ which is input to an input terminal IE of the expansible ring of the 4×4 ATM unit switch element of the logical address "KL1N", the wavelength $\lambda_{M0}$ which is input to an input terminal IE of the expansible ring of the 4×4 ATM unit switch element of the logical address "KLM0", the wavelength $\lambda_{M1}$ which is input to an input terminal IE of the expansible ring of the 4×4 ATM unit switch element of the logical address "KLM1", and the wavelength $\lambda_{MN}$ which is input to an input terminal IE of the expansible ring of the 4×4 ATM unit switch element of the logical address "KLMN" are that wavelength division multiplexing optical signals input to a wavelength division input terminal 1(IWE-1) are demultiplexed in a wavelength division demultiplexer 1(WDM DMX-1).

The wavelength $\lambda_{00}$ which is input to an input terminal IS of the expansible ring of the 4×4 ATM unit switch element of the logical address "KL00", the wavelength $\lambda_{01}$ which is input to an input terminal IS of the expansible ring of the 4×4 ATM unit switch element of the logical address "KL01", and the wavelength $\lambda_{0N}$ wich is input to an input terminal IS of the expansible ring of the 4×4 ATM unit switch element of the logical address "KL0" are wavelength division multiplexing optical signals input to a wavelength division input terminal 0(IWS-0), and are used to match data having a high-speed large capacity, and are demultiplexed in a wavelength division demultiplexer 0(WDM DMX-0).

The wavelength $\lambda_{10}$ which is input to an input terminal IS of the expansible ring of the 4×4 ATM unit switch element of the logical address "KL10", the wavelength $\lambda_{11}$ which is input to an input terminal IS of the expansible ring of the 4×4 ATM unit switch element of the logical address "KL11", the wavelength $\lambda_{1N}$ which is input to an input terminal IS of the expansible ring of the 4×4 ATM unit switch element of the logical address "KL1N", the wavelength $\lambda_{M0}$ which is input to an input terminal IS of the expansible ring of the 4×4 ATM unit switch element of the logical address "KLM0", the wavelength $\lambda_{m1}$ which is input to an input terminal IS of the expansible ring of the 4×4 ATM unit switch element of the logical address "KLM1", and the wavelength $\lambda_{MN}$ which is input to an input terminal IS of the expansible ring of the 4×4 ATM unit switch element of the logical address "KLMN" are that wavelength division multiplexing optical signals input to a wavelength division input terminal 1(IWS-1), and are used to match data having a high-speed large capacity, and are demultiplexed in a wavelength division demultiplexer 1(WDM DMX-1).

The wavelength $\lambda_{00}$ which is generated from an output terminal OS of the expansible ring of the 4×4 ATM unit switch element of the logical address "KL00", the wavelength $\lambda_{01}$ which is generated from an output terminal OS of the expansible ring of the 4×4 ATM unit switch element of the logical address "KL01", and the wavelength $\lambda_{0N}$ which is generated from an output terminal OS of the expansible ring of the 4×4 ATM unit switch element of the logical address "KL0N" are input to a wavelength division multiplexer 0(WDM MUX-0) and then multiplexed. The wavelength division multiplexing output signals are used to match data having a high-speed large capacity, and are output to a wavelength division output terminal 0(0WS-0) of a switch node.

The wavelength $\lambda_{10}$ wich is generated from an output terminal OS of the expansible ring of the 4×4 ATM unit switch element of the logical address "KL10", the wavelength $\lambda_{11}$ which is generated from an output terminal OS of the expansible ring of the 4×4 ATM unit switch element of the logical address "KL11", and the wavelength $\lambda_{1N}$ which is generated from an output terminal OS of the expansible ring of the 4×4 ATM unit switch element of the logical address "KL1N", the wavelength $\lambda_{M0}$ which is generated from an output terminal OS of the expansible ring of the 4×4 ATM unit switch element of the logical address "KLM0", the wavelength $\lambda_{M1}$ which is generated from an output terminal OS of the expansible ring of the 4×4 ATM unit switch element of the logical address "KLM1", and the wavelength $\lambda_{MN}$ which is generated from an output terminal OS of the expansible ring of 4×4 ATM unit switch element of the logical address "KLMN" and are input to a wavelength division multiplexer 1(WDM MUX-1) and then multiplexed. The wavelength division multiplexing output signals are used to match data having a high-speed large capacity, and are output to a wavelength division output terminal 1(0WS-1) of a switch node.

Herein, 4×4 ATM unit switch elements having the logical addresses ("KL00", "KL01", "KL0N", "KL10", "KL11", "KL1N", "KLM0", "KLM1" and "KLMN") make a closed loop formed as a horizontal ring and a vertical ring, thereby forming a group "KL" switch node as a single ATM switch having a switching capacity being expressed as [{(M+1)×(N+1)}INPUT×{(M+1)×(N+1)}OUTPUT].

Figure 6:
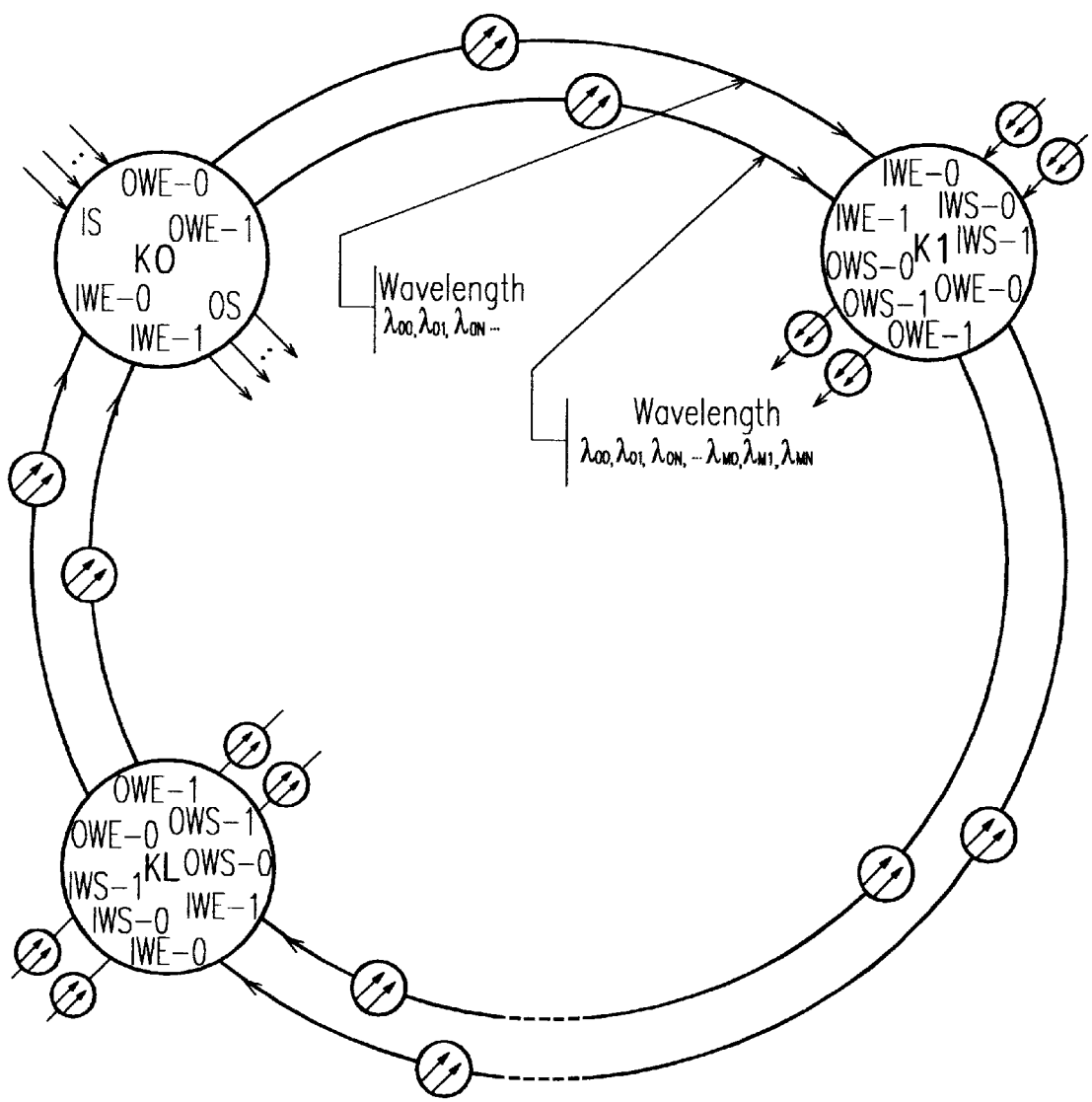
FIG. 6 shows a structure of, an ATM switch network having dual ring configuration using a wavelength division multiplexing according to the present invention.

FIG. 6 shows a structure of an ATM switch network having dual ring configuration using wavelength division multiplexing according to the present invention.

As shown in FIG. 6, a wavelength division output terminal 0(0WE-0) of an expansible ring in the group "K0" switch node being indicated as the logical address "K0" is connected to a wavelength division input terminal 0(IWE-0) of the group "K1" switch node being indicated as the logical address "K1", via an optical line. A wavelength division output terminal 0(0WE-0) of the group "K1" switch node is connected to a wavelength division input terminal 0(IWE-0) of an expansible ring in a group "KL" switch node being indicated as the logical address "KL", via an optical line. A wavelength division output terminal 0(0WE-0) of an expansible ring in the group "KL" switch node is connected to a wavelength division input terminal 0(IWE-0) in the group "K0" switch node, via an optical line. As a result, a first closed loop of an expansible ring is formed.

In addition, a wavelength division output terminal 1(0WE-1) of the group "K0" switch node being indicated as the logical address "K0" is connected to a wavelength division input terminal 1(IWE-1) of the group "K1" switch node being indicated as the logical address "K1", via an optical line. A wavelength division output terminal 1(0WE-1) of the group "K1" switch node is connected to a wavelength division input. terminal 1(IWE-1) of an expansible ring in the group "KL" switch node being indicated as the logical address "KL", via an optical line. A wavelength division output terminal 1(0WE-1) of an expansible ring in the group "KL" switch node is connected to a wavelength division input terminal 1(IWE-1) in the group "K0" switch node, via an optical line. As a result, a second closed loop of an expansible ring is formed.

The group "K0" switch node includes a plurality of input/output (I/O) terminals to match data having a low-speed small capacity, the number of the plurality of I/O terminals is {(M+1)×(N+1)}. As input for matching data having high-speed and large capacity, two optical lines are used toward each input terminal 0(IWS-0) and each input terminal 1(IWS-1) in the group "K1" switch node and the group "KL" switch node. As output for matching the data having high-speed and large capacity, two optical lines are used toward each output terminal 0(0WS-0) and each output terminal 1(0WS-1) in the group "K1" switch node and the group "KL" switch node.

Figure 7:
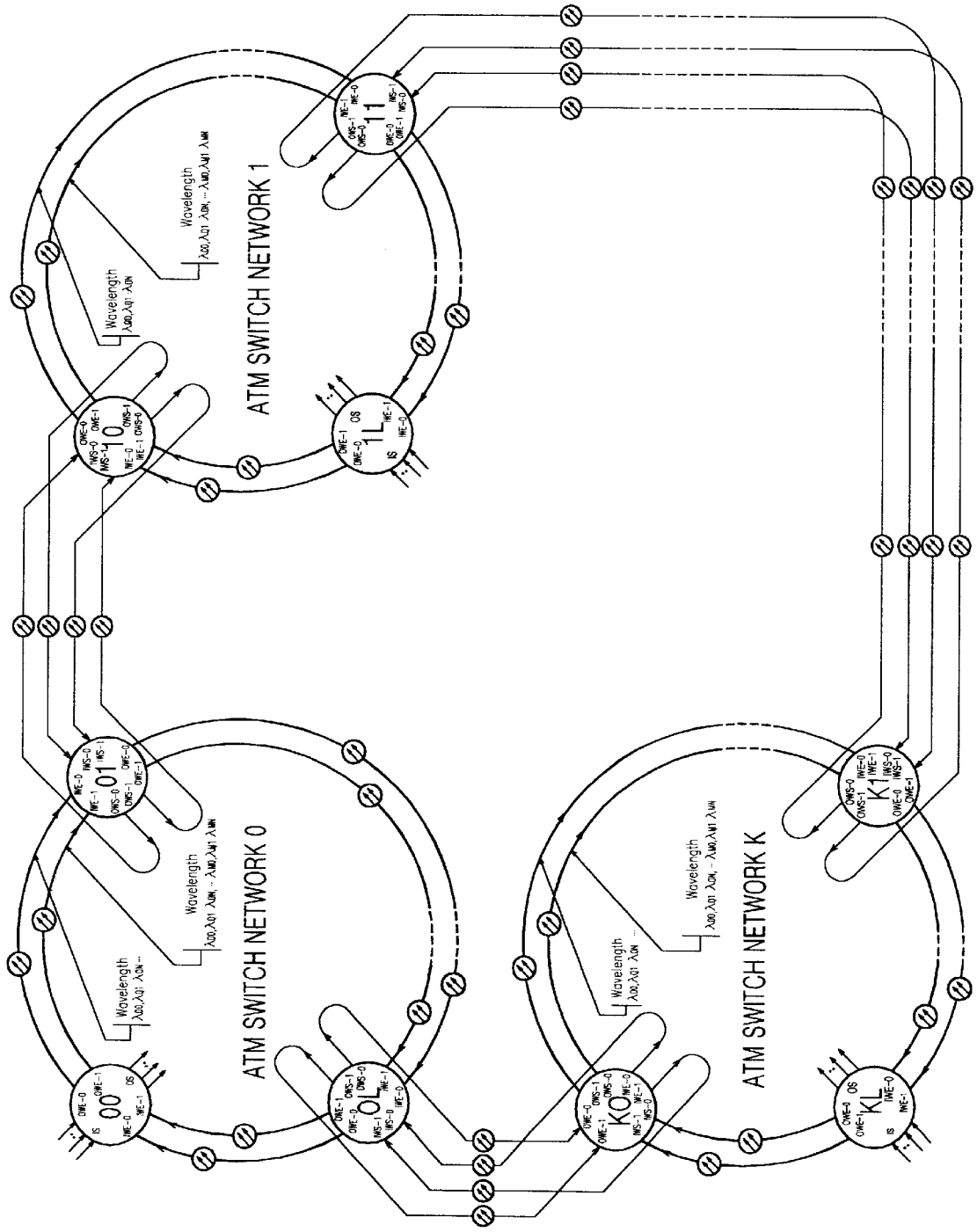
FIG. 7 shows a structure of an ATM switch network with an expansible optical ring according to the present invention.

FIG. 7 shows a structure of an ATM switch network with an expansible optical ring according to the present invention. There are a plurality of ATM switch networks (0,1, . . . , and K). Each ATM switch network includes at least two switch nodes which respectively have at least two wavelength division input terminals IWS-0 and IWS-1 and at least two wavelength division output terminals 0WS-0 and 0WS-1.

The input terminals IWS-0 and IWS-1 and the output terminals 0WS-0 and 0WS-1 are connected to a neighboring ATM switch network through two optical lines, thereby performing a gate-way function.

Accordingly, the output terminal 0WS-0 of a group "01" switch node of ATM switch network "0" is connected to the input terminal IWS-0 of a group "10" switch node of ATM switch network "1", via an optical line. And the output terminal 0WS-1 of a group "01" switch node of ATM switch network "0" is connected to the input terminal IWS-1 of a group "10" switch node of ATM switch network "1", via an optical line.

Here, a wavelength division whose number is {(M+1)×(N+1)}/2 is multiplexed in a single optical line.

The output terminal 0WS-0 of a group "11" switch node of ATM switch network "1" is connected to the input terminal IWS-0 of a group "L1" switch node of ATM switch network "K", via an optical line. And the output terminal 0WS-1 of a group "11" switch node of ATM switch network "1" is connected to the input terminal IWS-1 of a group "K1" switch node of ATM switch network "K", via an optical line.

The output terminal 0WS-0 of a group "K0" switch node of ATM switch network "K" is connected to the input terminal IWS-0 of a group "0L" switch node of ATM switch network "0", via an optical line. And the output terminal 0WS-1 of a group "K0" switch node of ATM switch network "K" is connected to the input terminal IWS-1 of a group "0L" switch node of ATM switch network "0", via an optical line. The plurality of ATM switch networks (0,1, . . . , K) form a ring by two optical lines, so that an entire ATM switch network becomes extended.

Herein, a switching capacity of a single ATM switch network is $\{(L1)\times(M1)\times(N1)\}$INPUT$\times\{(L+1)\times(M+1)\times(N+1)\}$OUTPUT, and a switching capacity of (K+1) ATM switch network is $\{(L-1)\times(M+1)\times(N+1)\times(K+1)\}$INPUT$\times\{(L-1)\times(M+1)\times(N+1)\times(K+1)\}$OUTPUT, thereby making a structure of an ATM switch network with an expansible optical ring.

As described above, as a local network, group switch nodes according to the present invention have a switching capacity of which the output value is expressed as $\{(M+1)\times(N+1)\}$INPUT$\times\{(M+1)\times(N+1)\}$OUTPUT.

A switching capacity of the group switch node can be extended from "0" to "L", so that the present invention has an effect of a traffic automatic adaptive network by a structure including a transmission network made of two optical links bisected by a wavelength division multiplexer.

A switching capacity of the ATM switch network making the group switch nodes by a primary expansion is $\{(L+1)\times(M+1)\times(N+1))\}$INPUT$\times\{(L+1)\times(M+1)\times(N+1)\}$OUTPUT, therefore the switching capacity is suitable for a large-capacity. If ATM switch networks are expanded by a secondary expansion, a switching capacity becomes $\{(L-1)\times(M+1)\times(N+1)\times(K+1)\}$INPUT$\times\{(L-1)\times(M+1)\times(N+1)\times(K+1)\}$OUTPUT, that is, the secondary expansion makes the switching capacity having a large capacity. Such ATM switch networks have a high applicability as an integrated services communication network at a densely built-in area.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An asynchronous transfer mode (ATM) switch network with an expansible optical ring comprising:

an ATM switch network that constructs a three-dimensional ring with an extensibility by forming a closed loop composed of a vertical ring, a horizontal ring and an expansible ring by using the 4×4 ATM unit switch elements, and makes a group switch node by grouping the 4×4 ATM unit switch elements forming the vertical ring and the horizontal ring wherein the group switch node receives a first data having a low-speed small capacity and a second data having a high-speed large capacity by an Input/Output (I/O) operation of a switch network, and matches the first data having low-speed small capacity with the second data having high-speed large capacity;

two wavelength division demultiplexers having channels that are bisected by two optical lines wherein the second data having high-speed large capacity is input to each 4×4 ATM unit switch element via the two wavelength division multiplexers and wherein an output signal of each 4×4 ATM unit switch element passes through a wavelength division multiplexer in response to the bisected channel and wherein the group switch node receives data for matching the second data having high-speed large capacity by the I/O operation of the switch network, and matches the data;

two optical lines through which the second data having high-speed large capacity is output to each 4×4 ATM unit switch element and wherein the second data is also output to the wavelength division demultiplexer, and wherein a plurality of the ATM switch networks being composed of group switch nodes having a high-speed large capacity data matching circuit interconnect wavelength division I/O terminals of the switch node by using wavelength division multiplexing optical lines, and thus have an extensibility of a large capacity.

2. The asynchronous transfer mode (ATM) switch network with an expansible optical ring as set forth in claim 1, wherein:

the three-dimensional ring connects an output terminal of 4×4 ATM unit switch element forming a group "0" to an input terminal forming a group "1", via a physical path, connects an output terminal of the 4×4 ATM unit switch element forming the group "1" to an input terminal forming a group "L" via a physical path, connects an output terminal of 4×4 ATM unit switch element forming the group "L" to an input terminal forming the group "0" via a physical path, thereby forming an expansible ring so as to expand a switching capacity.

3. The asynchronous transfer mode (ATM) switch netvork with an expansible optical ring as set forth in claim 2, wherein:

the output terminal of the 4×4 ATM unit switch element forming the group "0" forms a vertical ring and a horizontal ring having logical addresses "K000", "K010", "K0M0", "K001", "K011", "K0M1", "K00N", "K01N" and "K0MN" (where, the character "K" is an address for identifying the ATM switch network, the character "M" is an address for identifying the 4×4 ATM switch element positioned at a horizontal ring, and the character "N" is an address for identifying the 4×4 ATM switch element positioned at a vertical ring).

4. The asynchronous transfer mode (ATM) switch network with an expansible optical ring as set forth in claim 2, wherein:

the output terminal of the 4×4 ATM unit switch element forming the group "1" forms a vertical ring and a horizontal ring having logical addresses "K100", "K110", "K1M0", "K101", "K111", "K1M1", "K10N", "K11N" and "K1MN" (where, the character "K" is an address for identifying the ATM switch network, the character "M" is an address for identifying the 4×4 ATM switch element positioned at a horizontal ring, and the character "N" is an address for identifying the 4×4 ATM switch element positioned at a vertical ring).

5. The asynchronous transfer mode (ATM) switch network with an expansible optical ring as set forth in claim 2, wherein:

the output terminal of the 4×4 ATM unit switch element forming the group "L" forms a vertical ring and a horizontal ring having logical addresses "KL00", "KL10", "KLM0", "KL01", "KL11", "KLM1", "KL0N", "KL1N" and "KLMN" (where, the character "K" is an address for identifying the ATM switch netvork, the character "L" is an address for identifying the 4×4 ATM switch element positioned at an expansible ring, the character "M" is an address for identifying the 4×4 ATM switch element positioned at a horizontal ring, and the character "N" is an address for identifying the 4×4 ATM switch element positioned at a vertical ring).

* * * * *

UNITED STATES PATENT AND TRADEMARK OFFICE
CERTIFICATE OF CORRECTION

PATENT NO. : 6,393,024 B1
DATED : May 21, 2002
INVENTOR(S) : Seung Hyun Park et al.

It is certified that error appears in the above-identified patent and that said Letters Patent is hereby corrected as shown below:

<u>Title page,</u>
Item [75], change the inventor's name from "Seung Kyun Park" to -- Seung Hyun Park --.

Signed and Sealed this

Fourteenth Day of January, 2003

JAMES E. ROGAN
*Director of the United States Patent and Trademark Office*